United States Patent
Kamiya et al.

(10) Patent No.: US 9,297,431 B2
(45) Date of Patent: Mar. 29, 2016

(54) BRAKE PAD PRESSING SPRING AND DISC BRAKE HAVING BRAKE PAD PRESSING SPRING

(71) Applicant: ADVICS CO., LTD., Kariya (JP)

(72) Inventors: Yosuke Kamiya, Kariya (JP); Yuichi Takeo, Seto (JP)

(73) Assignee: ADVICS CO., LTD, Kariya (JP)

( * ) Notice: Subject to any disclaimer, the term of this patent is extended or adjusted under 35 U.S.C. 154(b) by 0 days.

(21) Appl. No.: 14/284,766

(22) Filed: May 22, 2014

(65) Prior Publication Data

US 2014/0345984 A1 Nov. 27, 2014

(30) Foreign Application Priority Data

May 22, 2013 (JP) .................. 2013-107881

(51) Int. Cl.
| | |
|---|---|
| F16D 65/40 | (2006.01) |
| F16D 65/00 | (2006.01) |
| F16D 65/097 | (2006.01) |

(52) U.S. Cl.
CPC ........ F16D 65/0006 (2013.01); F16D 65/0972 (2013.01)

(58) Field of Classification Search
CPC .............. F16D 65/097; F16D 65/0972; F16D 65/0977; F16D 65/0978; F16D 65/0979
USPC ............................................ 188/73.38, 73.37
See application file for complete search history.

(56) References Cited

U.S. PATENT DOCUMENTS

| | | | | |
|---|---|---|---|---|
| 3,977,499 A | * | 8/1976 | Johannesen | 188/73.38 |
| 4,037,689 A | * | 7/1977 | Maehara | 188/1.11 W |
| 9,016,442 B2 | * | 4/2015 | Odaira et al. | 188/73.38 |

FOREIGN PATENT DOCUMENTS

| | | | |
|---|---|---|---|
| JP | 10-331883 A | | 12/1998 |
| JP | 2003-028217 A | | 1/2003 |
| JP | 2011106558 A | * | 6/2011 |
| JP | 2012063014 A | * | 3/2012 |

* cited by examiner

*Primary Examiner* — Thomas J Williams
(74) *Attorney, Agent, or Firm* — Buchanan Ingersoll & Rooney PC

(57) ABSTRACT

A pad pressing spring which is mounted on a pad of a disc brake by causing a pinching portion to pinch a pad back plate is configured as follows. An elastic arm which presses the pad in a disc rotor normal-rotating direction continuously extends from a base end side of the pinching portion, and the elastic arm has a configuration in which, when a load exceeding a predetermined value is applied in a direction opposite to a direction in which a pad is pressed, a tip end side of the elastic arm comes into contact with a lateral surface of the pad back plate or the pinching portion, and thus a spring constant of the pad pressing spring increases compared to a spring constant in a state where a load exceeding the predetermined value is not applied.

10 Claims, 5 Drawing Sheets

BRAKE PAD PRESSING SPRING AND DISC BRAKE HAVING BRAKE PAD PRESSING SPRING

TECHNOLOGICAL FIELD

The present invention relates to a brake pad pressing spring which presses a brake pad of a disc brake and which pushes the brake pad to a torque receiving surface and a disc brake using the same.

BACKGROUND DISCUSSION

In a vehicular disc brake, a brake pad pressing spring (hereinafter, referred to as a pad pressing spring for short) is provided to prevent a brake pad (hereinafter, referred to as a pad for short) from rattling during traveling and the pad is pressed to a torque receiving surface in advance. An example of a pad pressing spring used for the object described above is also used as an indicator for detecting an abrasion limit of the pad.

The pad pressing spring also used as an indicator reduces a striking noise (a so-called clink noise or click noise) which is caused by collision of the pad against the torque receiving surface formed on a caliper or a caliper supporting member (a mount), in such a manner that the pad pressing spring reduces, using a spring force, a movement speed of a brake pad during a braking operation of rearward traveling of a vehicle. The pad pressing spring is mounted on a part of a pad back plate (a back plate of the pad), which is a torque transmitting portion on a disc-rotor (hereinafter, also referred to simply as a disc for short) leading side in a forward-traveling mode of a vehicle. An elastic arm of the pressing spring abuts on a part of the caliper or the caliper supporting member (a mounting), which is the torque receiving surface on a disc trailing side in the forward-traveling mode of a vehicle, and the spring force generated by the elastic arm presses the pad in a disc-rotor rotating direction (a normal-rotating direction) in the forward-traveling mode of a vehicle. Accordingly, the pressing spring presses the pad to a torque receiving surface on the disc trailing side in the forward-traveling mode of a vehicle.

Two types, that is, a caulking fixing type (JP-A-10-331883) and a pinching fixing type (a so-called clip type JP-A-2003-28217), of a pad pressing spring have been used, relative to a mounting type of the pad pressing spring on the pad back plate. In the pinching fixing type pad pressing spring disclosed in JP-A-2003-28217, a pair of facing pinching pieces, which pinch the pad back plate in a thickness direction, are formed in such a manner that one end side of a strip-shaped spring material is bent in a U shape. In addition, an elastic arm which generates a spring force and presses the pad in the disc normal-rotating direction is formed on a tip end of the pinching piece which is disposed on a rear surface side of the pad back plate.

A caulking fixing type pad pressing spring has a number of factors of a variation in sizes and it is difficult to precisely perform a caulking fixing work on a target position. Furthermore, there is a concern that costs may increase due to the added caulking process. Meanwhile, in a case of a pinching fixing type pad pressing spring, a caulking process is not necessary. However, when a tangential force (a load acting in a tangential direction of the disc) caused by a braking operation of rearward traveling is applied to the pad, a spring deformation mode is not stabilized. Accordingly, spring performance may be unstable due to a variation in the deformation mode, and thus there is a concern that the desired effect may not be obtained.

Two factors can be conceived as the reasons why the deformation mode of a pinching fixing type pad pressing spring of the related art is not stabilized. A first factor is that a pinched state by the pinching portions is unstable, and thus it is easy for the pad pressing spring to move with respect to the pad back plate. When the elastic arm is elastically deformed, a tip end side of the pinching piece moves outward, and thus, in some cases, the pinching piece on a side in which the elastic arm extends floats up from a rear surface of the pad back plate. In this state, the pinching piece is also elastically deformed, and thus an unstable spring force due to deformation of the pinching piece is added to the spring force by the elastic arm. As a result, a variation in the spring performance increases. A second factor of the reason why the deformation mode is not stabilized is that a variation in deformation of the elastic arm, which is caused by the displacement of the pad, is likely to occur. In the case of a pinching fixing type pad pressing spring, when the pad is pressed to the disc or the pad is separated from the disc, if a follow-up operation of a contact point of the elastic arm, relative to the torque receiving portion, is smoothly performed, a variation in deformation state does not occur. However, in the case of a pinching fixing type pad pressing spring of the related art, the rigidity of the elastic arm relative to a load in a disc axial direction is not sufficient, and thus the follow-up movement of the contact point does not be performed during displacement of the pad. Accordingly, the deformation amount of the elastic arm increases or decreases, and thus relative displacement between the pad and the torque receiving surface is absorbed. As a result, an increase/decrease in the deformation amount also causes a variation in the spring performance.

SUMMARY

The invention is made in consideration of the related art described above. An object of the invention is that mounting of a pinching fixing type pad pressing spring on a pad back plate is stabilized and, furthermore, a deformation mode of an elastic arm is stabilized, and thus a striking noise suppression performance during a braking operation of rearward traveling and a so-called squeal noise prevention performance of a brake are improved.

To solve the problem described above, according to an aspect of the invention, there is provided a brake pad pressing spring which is mounted on a brake pad of a disc brake by causing a pinching portion to pinch a pad back plate, in which an elastic arm which presses the brake pad in a disc rotor normal-rotating direction continuously is formed on a base end side of the pinching portion and the elastic arm has a configuration in which, when a load exceeding a predetermined value is applied in a direction opposite to a direction in which a pad is pressed, a tip end side of the elastic arm comes into contact with a lateral surface of the pad back plate or the pinching portion, and thus a spring constant of a pressing spring increases compared to a spring constant in a state where a load exceeding the predetermined value is not applied.

In the pad pressing spring of the invention, since the elastic arm continuously is formed so as to extend from the base end side of the pinching portion, it is difficult for influence of a force of the elastic arm to affect the pinching portion. Accordingly, a pinched state of the pad back plate by the pinching portion is stabilized, and thus the movement of the pad pressing spring hardly occurs. Furthermore, since the elastic arm continuously is formed so as to extend from the base end side of the pinching portion, even when, for example, a tip end of the pinching piece of the pinching portion floats up from the pad back plate, the spring constant of the elastic arm, which reduces the movement speed of the pad during a braking operation of rearward traveling, is hardly changed. Furthermore, since the elastic arm continuously is formed so as to extend from the base end side of the pinching portion, the moment length of a curved portion or a bending of the elastic arm is shortened, relative to a force which is directed in a disc axial direction and is applied to the elastic arm during a forward/rearward movement of the pad. Thus, it is possible to improve the rigidity of the elastic arm against a load in the disc axial direction. Since the rigidity is improved, when the pad moves, a follow-up movement of a contacting portion of the elastic arm with respect to the torque receiving surface is easily performed. Therefore, a variation in a deformation state of the elastic arm, which is caused by follow-up failure, is also suppressed. The above-described synergistic effect and the like cause the spring constant to be stabilized, and thus a striking noise suppression performance during a braking operation of rearward traveling and a so-called squeal noise prevention performance of a brake are improved.

BRIEF DESCRIPTION OF THE DRAWING FIGURES

DETAILED DESCRIPTION

Figure 1:
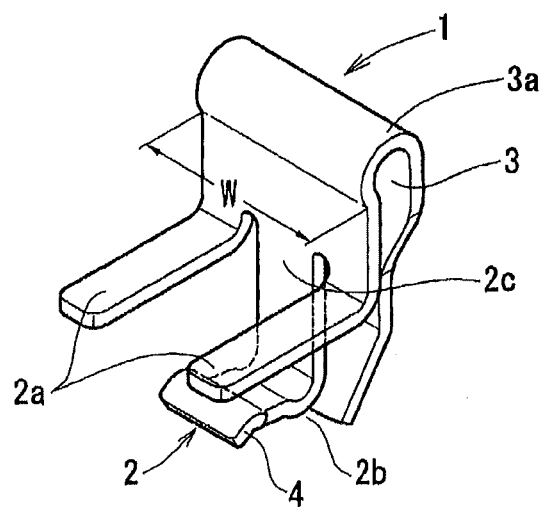
FIG. 1 is a perspective view illustrating an example of a pad pressing spring of the invention.
Figure 2:
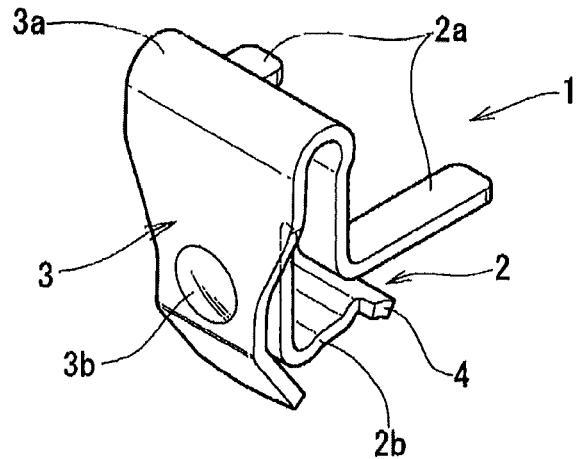
FIG. 2 is a perspective view of the pad pressing spring of FIG. 1, when viewed from a direction opposite to the direction of FIG. 1.
Figure 3:
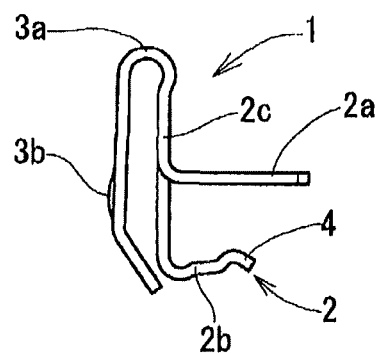
FIG. 3 is a side view of the pad pressing spring of FIG. 1.

Hereinafter, embodiments of a pad pressing spring and a disc brake of the invention will be described with reference to FIGS. 1 to 11 of the accompanying drawings. A pad pressing spring 1 exemplified in this description includes a pinching portion 2, an elastic arm 3 which is provided to extend from a base end side of the pinching portion, and a biasing force generation portion 4 which is formed on a tip end of a pinching piece of the pinching portion 2, as illustrated in FIGS. 1 to 3.

Figure 4:
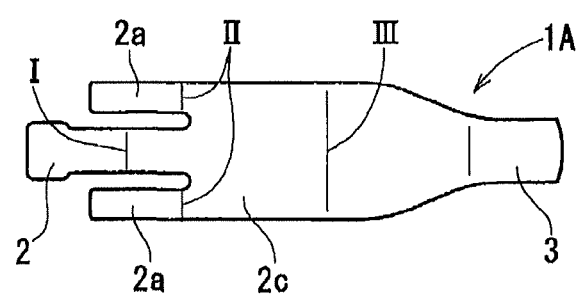
FIG. 4 is a development view of the pad pressing spring of FIG. 1.
Figure 5:
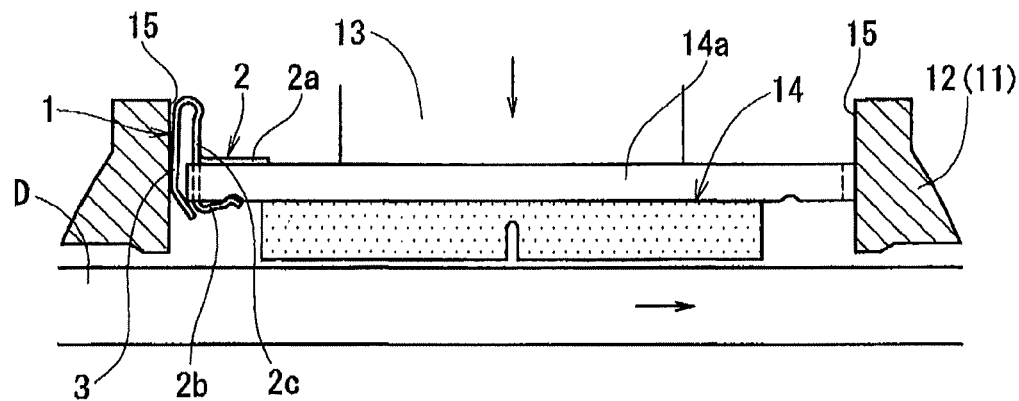
FIG. 5 is a plan view illustrating a state in which the pad pressing spring of FIG. 1 is mounted on a pad of a disc brake, when viewed from an outer circumferential side of a disc.
Figure 6:
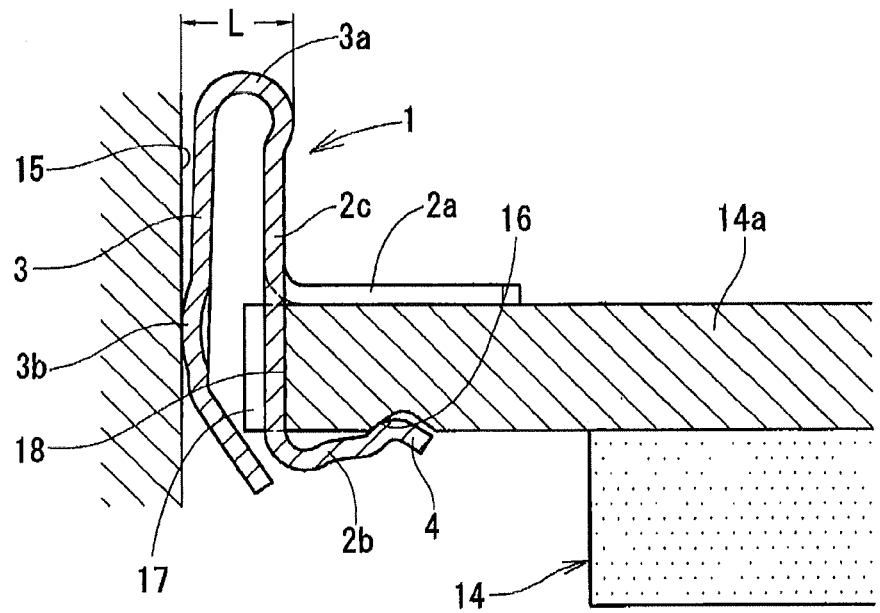
FIG. 6 is a partially enlarged cross-sectional view of FIG. 5.

The pad pressing spring 1 is formed as follows. First, a blank material 1A constituted by a single plate material as illustrated in FIG. 4 is obtained, in a punched manner, from a spring steel plate of stainless steel. Then, the blank material 1A is bent in necessary portions. The pad pressing spring 1 is used in a state where the pad pressing spring 1 is mounted on a pad back plate 14a of a disc brake, as illustrated in FIGS. 5 and 6. The pinching portion 2 is constituted by pinching pieces 2a, 2b and a connection wall 2c. The pinching pieces 2a, 2b pinch the pad back plate 14a. The connection wall 2c has a plate shape and connects base end portions of the pinching pieces. In the following description, the pinching piece 2a is referred to as a first pinching piece and the pinching piece 2b is referred to as a second pinching piece.

The first pinching piece 2a and the second pinching piece 2b are formed in such a manner that the respective bending portions I, II of the blank material 1A of FIG. 4 are subjected to valley folding. The connection wall 2c is constituted by a flat plate portion between the bending portions I, II of the blank material 1A and a flat portion extending from the position of the bending portion II to a bending portion III side. In the description of the invention, the base end side of the pinching portion 2 indicates a side on which the connection wall 2c is located. In the pad pressing spring 1 exemplified in the description, two first pinching pieces 2a, 2a and one second pinching piece 2b are provided. The base end portions of the two first pinching pieces 2a, 2a, the base end portions being connected to the connection wall 2c, are aligned in parallel. The first pinching pieces 2a, 2a and the second pinching piece 2b have a staggered arrangement such that the second pinching piece 2b is located in a portion between the two first pinching pieces 2a, 2a. The pad back plate is pinched, at three positions, by the first pinching pieces 2a, 2a and the second pinching piece 2b.

The elastic arm 3 is formed to be bent back in a mountain folding state such that a turn portion 3a is formed. The turn portion 3a is a part of the blank material 1A of FIG. 4, which is curved at the position of the bending portion III. A portion extending from the position of the turn portion 3a to a tip end, that is, a free end, of a bent-back portion is the elastic arm 3. The turn portion 3a functions as a spring force generation portion of the elastic arm 3. The connection wall 2c is a wall portion which protrudes, by the predetermined amount, in a direction away from the pad back plate 14a, in a state where the pad pressing spring 1 is mounted on the pad 14, as illustrated in FIG. 5. The base end portion of the elastic arm 3 continuously extends from the protruding end of the connection wall 2c.

The elastic arm 3 is in contact with a torque receiving surface 15 of a caliper 11 or a caliper supporting member 12 of the disc brake, in a state where the elastic arm 3 generates a spring force, as illustrated in FIGS. 5 and 6. A state in which a reaction force is received by the torque receiving surface 15 is maintained, and thus the elastic arm 3 generates the spring force which presses the pad 14 in a normal rotating direction (a rotating direction in forward-traveling mode of a vehicle) of a disc. The elastic arm 3 is in contact with a torque receiving surface 15 of a caliper 11 or a caliper supporting member 12 of the disc brake, in a state where the elastic arm 3 generates a spring force, as illustrated in FIGS. 5 and 6. A state in which a reaction force is received by the torque receiving surface 15 is maintained, and thus the elastic arm 3 generates the spring force which presses the pad 14 in a normal rotating direction (a rotating direction in forward-traveling mode of a vehicle) of a disc.

Figure 9:
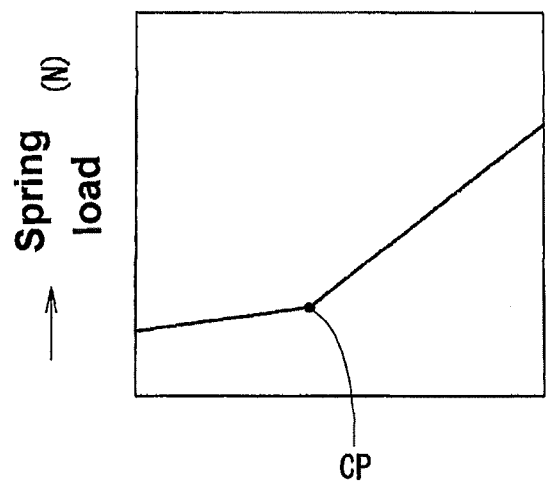
FIG. 9 is a view illustrating change in spring constant of the pad pressing spring of the invention.

Accordingly, in a state where the pad back plate 14a is cantilever-supported using the elastic arm 3, a spring load gently increases relative to a pad movement during a braking operation of rearward traveling, as illustrated in FIG. 9. However, the spring load steeply increases, relative to the pad movement, in a position where the tip end side of the elastic arm 3 comes into contact with the pinching portion 2, and thus the supporting state is switched to a cantilever-supporting state using practically both the elastic arm 3 and the tip end of the elastic arm 3. As a result, a shocking collision of the pad against the torque receiving surface is alleviated during the braking operation of rearward traveling. Even when the pad pressing spring 1 has a configuration in which, when a load exceeding a predetermined value is applied, the elastic arm 3 directly comes into contact with a lateral surface of the pad back plate 14a, the same effect is obtained. In the pad pressing spring 1 exemplified in the description, the elastic arm 3 extends from the base end side of the pinching portion 2, and thus variation in a spring deformation mode is suppressed. Accordingly, the position of a changing point (a changing position of the spring constant) of spring properties CP is stabilized in FIG. 9. As a result, a striking noise suppression performance during a braking operation of rearward traveling is improved and, furthermore, a so-called squeal noise prevention performance of a brake is improved.

A width W (see FIG. 1) of the base end portion of the elastic arm 3, that is, a portion in which the turn portion 3a is connected to the connection wall 2c in a disc axial direction is set to a value adequate to extend across the first pinching piece 2a and the second pinching piece 2b. The width W of the base end portion of the elastic arm of the pad pressing spring 1 illustrated in the accompanying drawings is the same as that of the maximum width portion of the connection wall 2c. When the size of the base end portion of the elastic arm 3 is small enough to be fitted in a width range of one pinching piece, an elastic reaction force of the elastic arm 3 is likely to act on the base end portion of the only one pinching piece. In this case, there is a concern that the phenomenon described above may affect the positional relationship between the first pinching piece and the second pinching piece, for example, a degree of opening between both pinching pieces.

On the contrary, when the base end portion of the elastic arm 3 has the width adequate to extend across or straddle the first pinching piece 2a and the second pinching piece 2b as illustrated in the accompanying drawings, the elastic reaction force is separately transmitted to the first pinching pieces and the second pinching piece. Thus, when a force acts on one pinching piece in a direction in which the one pinching piece moves outward, a force acts on the other pinching piece in a direction in which the other pinching piece moves inward. As a result, it is possible to avoid a situation, for example, an adverse effect affecting the positional relationship between the first pinching piece and the second pinching piece.

The biasing force generation portion 4 is provided in the tip end of the second pinching piece 2b. The biasing force generation portion 4 generates a force causing the connection wall 2c to be pressed to a lateral surface (which is the lateral surface on rear side in a disc normal-rotating direction) of the pad back plate 14a, which is the lateral surface on a disc leading side in a normal rotation mode of the disc. As a result, the biasing force generation portion 4 functions by eliminating a movement margin of the connection wall 2c. When the movement of the connection wall 2c is suppressed, it is difficult for the displacement of the pinching portion 2 or the variation in the spring deformation mode to occur. As a result, this also influences the suppression of the variation in the spring constant.

Figure 7:
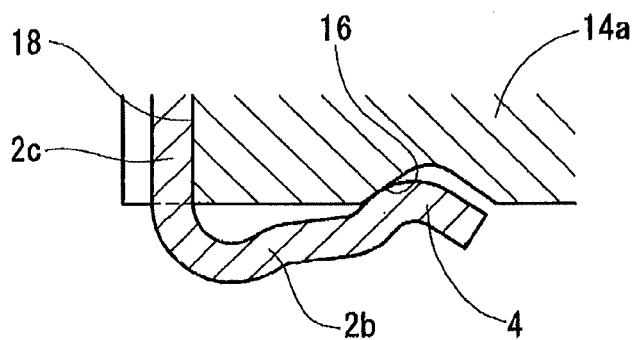
FIG. 7 is a partially further enlarged cross-sectional view of FIG. 6.

The biasing force generation portion 4 illustrated in the accompanying drawings abuts on an inclined surface 16 formed on the pad back plate 14a, as illustrated in FIG. 7. The inclined surface 16 is inclined in a direction in which the inclined surface 16 comes close to the first pinching piece 2a, as the inclined surface 16 moves away from a base end of the second pinching piece 2b (see FIG. 6). Accordingly, a component force directed to a right side in FIG. 7 is generated, by a pinching force caused by elastic restoring of the second pinching piece 2b, in a contacting portion of the biasing force generation portion 4 relative to the inclined surface 16. This component force causes the connection wall 2c to be pulled to the right side in the accompanying drawings, and thus the connection wall 2c is pressed to the lateral surface of the pad back plate 14a.

In a state where the connection wall 2c is separated from the lateral surface of the pad back plate 14a, when the elastic arm 3 is inserted into a portion between the connection wall 2c and the torque receiving surface 15, and then the elastic arm 3 is elastically deformed, the connection wall 2c moves, in some cases, in a direction in which the connection wall 2c is pressed to the lateral surface of the pad back plate 14a. Accordingly, there is a concern that the displacement of the pinching portion and the variation in the spring deformation mode, both of which are caused by the phenomenon described above, may influence the spring constant of the pressing spring. L in FIG. 6 illustrates a moment length of a curved portion or a bending of the elastic arm 3. In the pad pressing spring 1 of the invention, the elastic arm 3 is provided on the base end side of the pinching portion 2. Thus, it is possible to sufficiently reduce the moment length L, compared to a pinching fixing type pad pressing spring of the related art. Therefore, the rigidity of the elastic arm 3 relative to a load in a disc axial direction is set to be greater than that of a pad pressing spring of the related art. Accordingly, when the pad moves in the disc axial direction, it is possible to improve follow-up properties of the pad pressing spring 1 relative to the pad back plate 14a. In a state where the rigidity of the elastic arm 3 relative to the load in the disc axial direction increases, when the pad moves forward or rearward in accordance with a braking operation or a braking-releasing operation, the contacting portion of the elastic arm 3 with respect to the torque receiving surface slides on the torque receiving surface 15. Therefore, the elastic arm 3 follows the movement of the pad. As a result, the variation in a deformation mode of the elastic arm 3, which is caused by the displacement of the pad, is suppressed, and thus spring properties of the pad pressing spring 1 is further stabilized.

Figure 8:
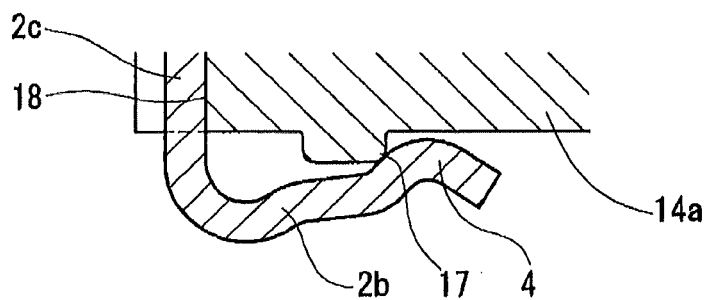
FIG. 8 is a cross-sectional view illustrating a modification example of a locked state between a biasing force generation portion provided in the pad pressing spring and a pad back plate.

3b illustrated in FIG. 6 is a spherical contact point which is formed on the elastic arm 3 by press working. This contact point 3b is in point contact with the torque receiving surface 15. Thus, the contact resistance of the elastic arm 3 is small with respect to the torque receiving surface 15 and this encourages an improvement in follow-up properties relative to the pad movement. It is preferable that the width of the tip end side of the elastic arm 3 be set small as illustrated in FIG. 2. The reason for this is that it is possible to reliably prevent the elastic arm 3 to be placed between the torque transmitting surface of the pad and the torque receiving surface 15, during the braking operation of rearward traveling of a vehicle. In the pad pressing spring 1 exemplified in the description, the tip end of the elastic arm 3 protrudes from the lateral surface of the pad back plate 14a to a disc D side by a predetermined amount, as can be understood from FIGS. 5 and 6. Thus, the pad pressing spring 1 is also used as an abrasion indicator of the pad. However, it is not essential that the pad pressing spring 1 is also used as an abrasion indicator but rather it is preferred. The biasing force generation portion 4 described above may have a shape in which a corner portion is formed on the tip end of the pinching piece and the corner portion abuts on the inclined surface of the pad back plate. Furthermore, as illustrated in FIG. 8, the biasing force generation portion 4 may have a shape in which a corner portion 17 is provided on the pad back plate 14a and the corner portion 17 comes into contact with the inclined surface of the biasing force generation portion 4. The biasing force generation portion 4 may be provided in the tip end of the first pinching piece 2a or may be provided in the tip ends of both the first pinching piece 2a and the second pinching piece 2b.

Figure 10:
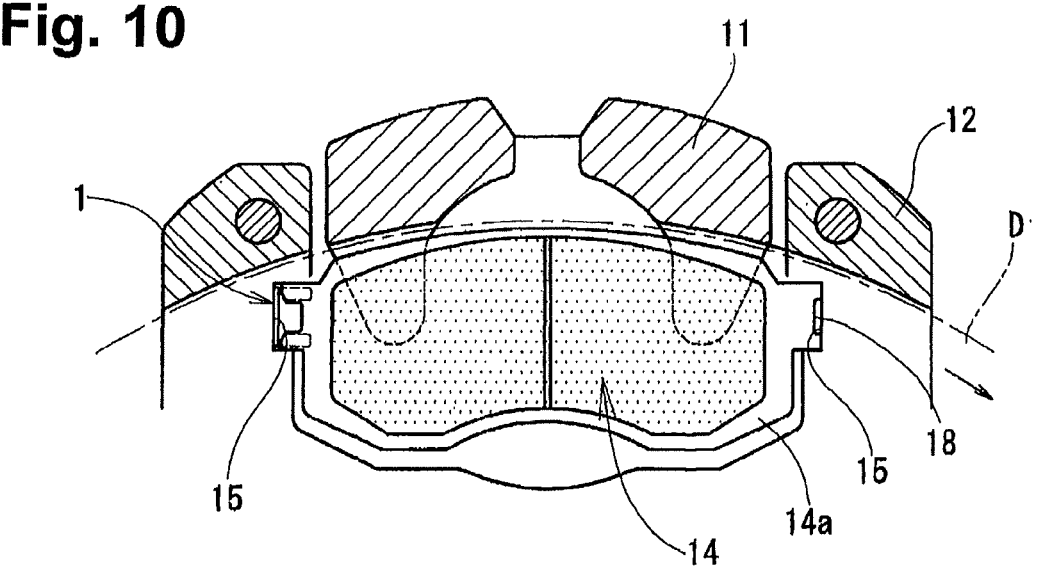
FIG. 10 is a cross-sectional view illustrating an example of a float type disc brake to which the invention is applied.

FIG. 10 illustrates an example in which the pad pressing spring of the invention is applied to a float type disc brake. A float type disc brake 10 has a configuration in which the caliper 11, the caliper supporting member (a mount) 12 which slidably supports the caliper 11 in the disc axial direction, a piston 13 (see FIG. 5) which is installed in an inner-side cylinder (not illustrated) of the caliper 11, an inner-side pad (not illustrated) which is pressed by the piston and pushed to the disc D, and an outer-side pad 14 facing the inner-side pad are assembled.

In the float type disc brake 10, the torque receiving surface 15 is provided in the caliper supporting member 12. The pad pressing spring 1 is provided in the torque transmitting portion on the disc leading side in the normal rotation mode of the disc D, that is, when the disc D rotates in a vehicle forward traveling direction. A notch portion 18 is provided in both front lateral surface (the surface forming the torque transmitting surface) and rear lateral surface of the pad back plate 14a in the disc rotating direction. The pad pressing spring 1 is mounted on the pad 14 in such a manner that the connection wall 2c of the pinching portion 2 is inserted into the notch portion 18 on the rear side in a disc normal-rotating direction and both the first pinching piece 2a and the second pinching piece 2b pinch the pad back plate 14a.

Although not illustrated in FIG. 10, the connection wall of the pinching portion of the pad pressing spring 1 is pressed to the lateral surface which is formed on the pad back plate 14a and in a concave shape by the notch portion 18, by the operation of the biasing force generation portion 4 illustrated in FIG. 7. In the state illustrated in FIG. 10, the reaction force, which is a repulsive force, of the elastic arm 3 is received by the torque receiving surface 15 on the disc leading side (on a left side in FIG. 10). Accordingly, the spring force generated by the elastic arm 3 presses the pad 14 in the disc normal-rotating direction, and thus the pad 14 is pressed to the torque receiving surface 15 on the disc trailing side. The same pressing operation also acts on the inner-side pad (not illustrated), by the pad pressing spring 1.

Figure 11:
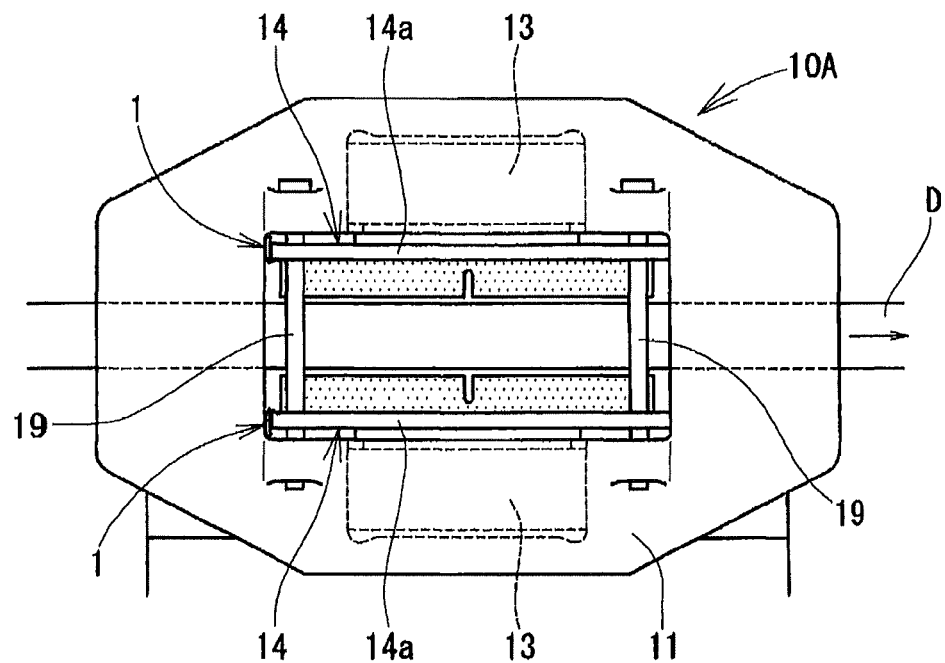
FIG. 11 is a plan view illustrating an example of an opposed piston type disc brake to which the invention is applied.

FIG. 11 illustrates an example in which the pad pressing spring 1 of the invention is applied to an opposed piston type disc brake. In an opposed piston type disc brake 10A, the pistons 13 are respectively installed in both an inner side cylinder and an outer side cylinder of the caliper 11 and the pistons 13 respectively press the inner-side and outer-side pads 14. Accordingly, the pads 14 come into slide contact with the disc D. A pad pin 19 which is installed to be suspended across window hole portions of the caliper passes through pin holes formed on the pad back plates 14a, and thus the pad 14 is slidably supported, by the pad pin 19, in the disc axial direction. The torque receiving surface 15 of the opposed piston type disc brake 10A is provided in the caliper 11 and the pad pressing spring 1 is provided in the torque transmitting portion on the disc leading side in the normal rotation mode of the disc D. The installation aspect of the pad pressing spring 1 is not much different from the aspect illustrated in FIG. 5. Thus, the description of the installation aspect will not be repeated.

In the disc brake of the invention, configured as described above, a striking noise suppression performance during a braking operation of rearward traveling and a so-called squeal noise prevention performance of a brake are improved by an operation of the pad pressing spring 1 of the invention, regardless of a float type and an opposed piston type.

What is claimed is:

1. A brake pad pressing spring which is mounted on a brake pad of a disc brake by causing a pinching portion to pinch a pad back plate,
    wherein an elastic arm which presses the brake pad in a disc rotor normal-rotating direction continuously is formed on a base end side of the pinching portion,
    wherein the elastic arm has a configuration in which, when a load exceeding a predetermined value is applied in a direction opposite to a direction in which the pad is pressed, a tip end side of the elastic arm comes into contact with a lateral surface of the pad back plate or the pinching portion, and thus a spring constant of the brake pad pressing spring increases compared to a spring constant in a state where a load exceeding the predetermined value is not applied,
    wherein the pinching portion is constituted by a first pinching piece and a second pinching piece which pinch the pad back plate, and a plate-shaped connection wall connecting base end portions of the first and second pinching pieces,
    wherein the base end portion of the first pinching piece and the base end portion of the second pinching piece are aligned in parallel,
    wherein the first pinching piece, the second pinching piece, and the connection wall are formed by bending a single plate material, and
    wherein the width of the base end portion of the elastic arm is set to a value adequate to straddle the first pinching piece and the second pinching piece.

2. The brake pad pressing spring according to claim 1,
    wherein at least one of the first pinching piece and the second pinching piece includes a biasing force generation portion which is engaged to the pad back plate and generates a biasing force and which presses, using the biasing force, the connection wall to a lateral surface of the pad back plate, which is the lateral surface on a rear side in the disc rotor normal-rotating direction.

3. The brake pad pressing spring for a disc brake according to claim 2,
    wherein the brake pad pressing spring is also used as an abrasion indicator, in such a manner that, in a state where the brake pad pressing spring is mounted on the pad back plate, a tip end of the elastic arm protrudes above a friction material adhered surface of the pad back plate, to a disc rotor side by a predetermined amount, and thus the tip end of the elastic arm comes into contact with the disc rotor, in an abrasion limit point of a friction material of the brake pad.

4. The brake pad pressing spring according to claim 2,
    wherein the biasing force generation portion has a configuration in which an inclined surface or a corner portion is formed on the pinching piece including the biasing force generation portion and a pressing force of the connection wall with respect to the lateral surface of the pad back plate is generated by pressing the inclined surface or the corner portion to the pad back plate, using an elastic pinching force of the pinching piece.

5. The brake pad pressing spring for a disc brake according to claim 4,
    wherein the brake pad pressing spring is also used as an abrasion indicator, in such a manner that, in a state where the brake pad pressing spring is mounted on the pad back plate, a tip end of the elastic arm protrudes above a friction material adhered surface of the pad back plate, to a disc rotor side by a predetermined amount, and thus the tip end of the elastic arm comes into contact with the disc rotor, in an abrasion limit point of a friction material of the brake pad.

6. The brake pad pressing spring for a disc brake according to claim 1, wherein the brake pad pressing spring is also used as an abrasion indicator, in such a manner that, in a state where the brake pad pressing spring is mounted on the pad back plate, a tip end of the elastic arm protrudes above a friction material adhered surface of the pad back plate, to a disc rotor side by a predetermined amount, and thus the tip end of the elastic arm comes into contact with the disc rotor, in an abrasion limit point of a friction material of the brake pad.

7. A disc brake comprising:

a caliper having a brake piston installed therein; and the brake pad pressing spring according to claim 1 which is mounted on the pad back plate of the brake pad, wherein the caliper or a torque member slidably holds the brake pad in a disc axial direction, and wherein the elastic arm of the brake pad pressing spring is interposed between the pad back plate and a torque receiving surface formed on the caliper or the torque member.

8. The disc brake according to claim 7, wherein, in the brake pad pressing spring, the pinching portion is constituted by the first pinching piece and the second pinching piece which pinch the pad back plate, and the plate-shaped connection wall connecting the base end portions of the first and second pinching pieces and at least one of the first pinching piece and the second pinching piece includes a biasing force generation portion which is engaged to the pad back plate and generates a biasing force and which presses, using the biasing force, the connection wall to a lateral surface of the pad back plate, which is the lateral surface on a rear side in a disc rotor normal-rotating direction, and wherein an inclined surface or a corner portion is formed on the pad back plate and a pressing force of the connection wall with respect to the lateral surface of the pad back plate is generated by pressing the biasing force generation portion of the brake pad pressing spring to the inclined surface or the corner portion, using an elastic pinching force of the pinching piece.

9. The brake pad pressing spring for a disc brake according to claim 1, wherein the number of either one of the first pinching piece or the second pinching piece of the pinching portion is two and the number of the other one is one, wherein the first and second pinching pieces have a staggered arrangement, and wherein pinching is performed at three positions by the first and second pinching pieces.

10. The brake pad pressing spring for a disc brake according to claim 9, wherein the brake pad pressing spring is also used as an abrasion indicator, in such a manner that, in a state where the brake pad pressing spring is mounted on the pad back plate, a tip end of the elastic arm protrudes above a friction material adhered surface of the pad back plate, to a disc rotor side by a predetermined amount, and thus the tip end of the elastic arm comes into contact with the disc rotor, in an abrasion limit point of a friction material of the brake pad.

* * * * *